Patented Aug. 16, 1927.

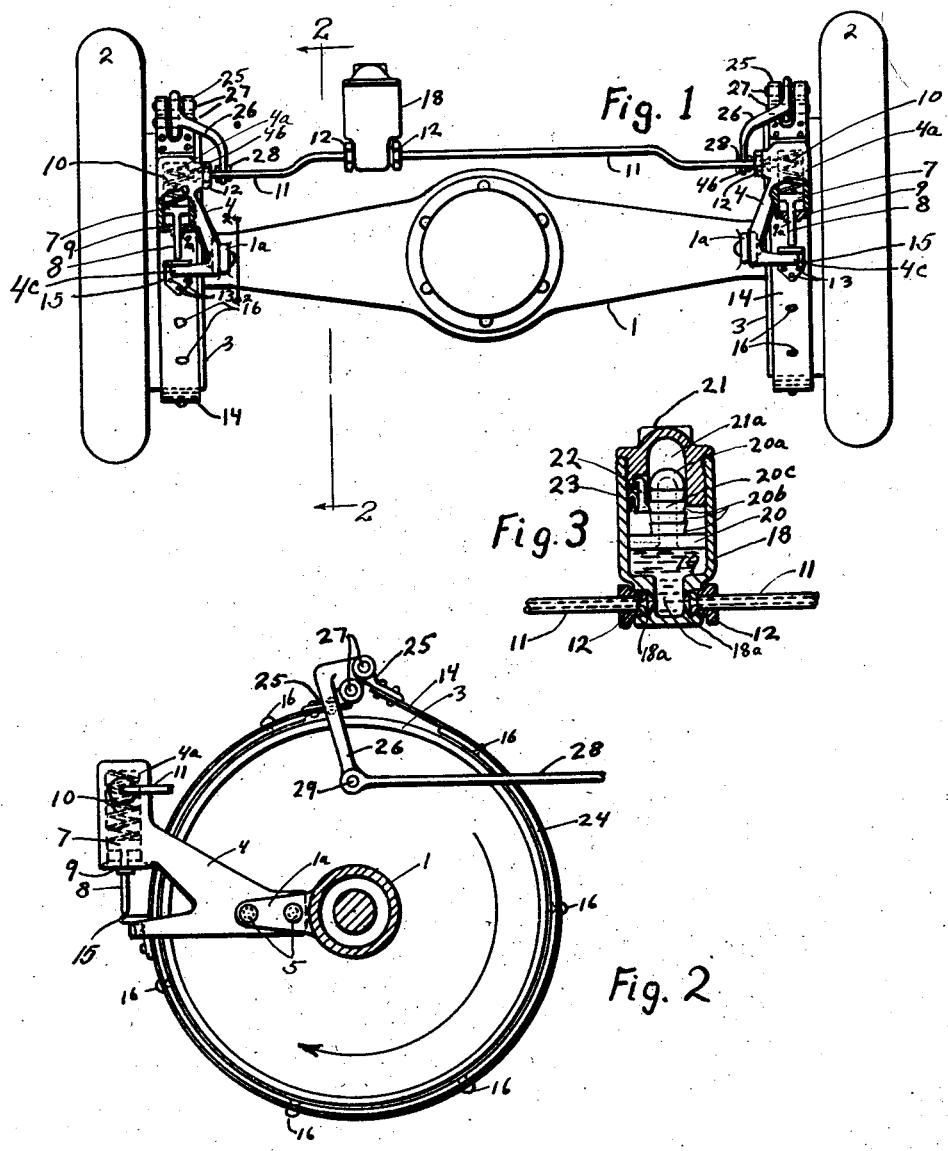

1,639,320

UNITED STATES PATENT OFFICE.

SAMUEL K. WELLMAN AND GORDON R. PENNINGTON, OF CLEVELAND HEIGHTS, OHIO.

EQUALIZING BRAKE FOR VEHICLES.

Application filed December 7, 1923. Serial No. 879,207.

The invention relates to improvements in vehicle brake mechanisms which are designed to operate on two or more wheels of the vehicle.

The object of our invention is to provide more perfect equalization of the braking effort applied to two or more vehicle wheels and consists in an equalizing mechanism which is actuated directly by the braking torques on the separate wheels.

Heretofore, it has been the general practice to attempt to secure equalization of the braking efforts on several wheels by equalizing the normal pressures applied to the braking surfaces. As the coefficients of friction of the latter surfaces frequently, however, vary through a range of from .2 to .5, the resultant braking efforts will vary in the same proportion.

This latter variation can be reduced to a negligible quantity by mechanism which operates to directly equalize the braking torques. Our invention consists in a simple and practical device for this purpose.

Referring to the attached drawings, Figure 1 shows a preferred form of our invention applied to the rear axle of an automobile, viewed from the rear of the latter, and partially cut away.

Figure 2 is a sectional view of the axle, the section being taken on the line 2—2 in Figure 1.

Figure 3 is an enlarged sectional view of the fluid reservoir.

Referring in detail to the mechanism illustrated, 1 indicates an axle of usual construction carrying the wheels 2 to which are fixed the brake drums 3.

Brackets 4 are fixed to lugs 1$^a$ of the axle 1 by rivets 5. Cylinders 4$^a$ are formed integral with brackets 4. Pistons 7 fixed to piston rods 8 are mounted in cylinders 4$^a$ with substantially liquid-tight fits. Cylinder heads 9 are provided with holes 9$^a$ to permit the passage of and to guide piston rods 8. Springs 10 are placed between pistons 7 and the tops of the cylinders 4$^a$. Passages 4$^b$ are formed in the walls of cylinders 4$^a$. Pipes 11 are held in connection with passages 4$^b$, and likewise in connection with passages 18$^a$ of the fluid reservoir 18 by the union nuts 12. The reservoir 18 may be carried at any convenient point and in any convenient manner.

The cylinders 4$^a$ above the pistons 7 and the pipes 11 and the oil reservoir 18 are filled with any liquid 19 upon the surface of which floats the piston 20 carrying the projection 20$^a$. The reservoir cover 21 which is threaded into the reservoir 18 is formed with a passage 21$^a$ which loosely fits the projection 20$^a$ of the piston 20. The catch 22 is held in engagement by the spring 23 with notches 20$^b$ on the projection 20$^a$ which are so cut as to permit free downward movement of the latter. An air dome 20$^c$ is formed inside the piston 20.

The braking material 24 is fixed by means of rivets 16 to the brake carrying bands 14. The two ends of the brake carrying bands 14 are fixed to end pieces 25 which are pivotally fixed to the levers 26 by means of the pins 27. Brake rods 28 are pivoted to the levers 26 by means of pins 29. Lugs 15 are fixed to the brake carrying bands 14 by means of rivets 13 and normally rest upon projections 4$^c$ of brackets 4.

The manner of operation is as follows: When the brake rods 28 are pulled through any convenient arrangement of levers, which will cause both rods to be moved thru substantially the same distance, the brake carrying bands 14 are caused to contract and press the braking material 24 against the brake drums 3. The rotation of the latter, which is in the direction of the arrow when the vehicle is going forward, develops thru friction a force tending to rotate the braking material 24 and the brake carrying bands 14 in the same direction. This force is applied thru the lugs 15 to the piston rods 8 and through the latter to the pistons 7 and to the springs 10 and the liquid 19. As the springs 10 are purposely given a very insufficient initial compression to resist the applied forces the pistons 7 move, causing the liquid to flow from each side into the reservoir 18. As the piston 20 is given a substantially liquid tight fit in the reservoir 18 and as this piston is prevented from moving upwards by the catch 22, the only space for the entering liquid to flow into is the air dome 20$^c$, which it does, compressing the air in the latter until a sufficient pressure is developed to counterbalance the braking forces on the pistons 7. When the pull on the brake rods 28 is relieved the braking forces vanish and the pressure of the air in the air dome 20$^c$, aided by the springs 10, replace the elements of the mechanism in their original relation.

It will be evident that the rotation of the brake carrying bands 14, described, is in such a direction, when the vehicle is moving forward, as to offset the original pull on the brake rods 28 and to diminish the contraction of the braking material and thereby to diminish the braking force.

Furthermore, it will be evident that the resisting forces due to the pressure of the liquid 19 on the pistons 7 must at all times be equal except for a negligible variation due to pipe resistance and therefore, as the springs 10 are purposely made relatively weak, the total resisting forces on the pistons 7 will at all times be substantially equal.

If then variations of coefficients of friction or of dimensions of parts cause initially a greater braking force to be developed, for example, on the left brake drum than on the right, the left brake carrying band will be rotated thru a greater angle than the right until by such rotation the pull on the left brake rod is sufficiently decreased to equalize the braking torques after which the system will be in equilibrium.

When the vehicle is moving backward the rotation of the brake carrying bands is resisted directly by the projections 4ᵉ of the brackets 4 and no equalization occurs.

We prefer to compensate for any leakage which may occur, by the downward movement of the piston 20, which is made of the proper specific gravity and form to float on the surface of the liquid, and which is fitted to the reservoir with a clearance just sufficient to allow the passage of the liquid at a sufficient rate to compensate for leakage but not sufficient to cause any appreciable loss of liquid during the brief interval during which the brakes are applied. It will be understood, however, that such compensation for leakage is incidental and not an essential part of our invention.

It will be evident that our invention may be applied to equalize the braking on any number of wheels in the same manner as, in the application herein described, to two wheels. Also that it is not limited to any specific manner of applying the brakes as this may be thru any mechanical or hydraulic means. Nor is it limited to the specific equalizing means shown as this may be greatly varied in construction provided the brake carrying members are prevented from rotating with the wheels by elements of the equalizing mechanism.

We claim:

1. In combination; a plurality of rotatable members, brakes adapted to bear on said members, mechanism for forcing said brakes into contact with said members, brake carrying elements receiving the frictional forces resulting from said contact, and hydraulic means connected to said brake carrying elements and operated by the said frictional forces to equalize the latter forces.

2. In a vehicle, the combination of a plurality of wheels, brake drums fixed to said wheels, brakes adapted to bear on said brake drums, mechanism for forcing said brakes into contact with said brake drums, and hydraulic means for varying the force of said contact on the various drums to equalize the resulting frictional torques on the latter.

3. In a vehicle, the combination of a plurality of wheels, brake drums fixed to said wheels, brakes adapted to bear on said brake drums, mechanism for forcing said brakes into contact with said brake drums, brake carrying elements receiving the frictional torques resulting from said contact, fluid equalizing means connected to said brake carrying elements so disposed as to resist and be operated by said frictional torques to equalize the latter when the vehicle is going in one direction and stops fixed to non-rotating portions of the vehicle so disposed as to resist the rotation of said brake carrying elements when the vehicle is going in the opposite direction.

4. The combination with a plurality of brakes having movable braking elements, and means for applying a braking pressure to one of said elements, of liquid pressure operated means adapted to be actuated by said element to cause the braking elements of the other brakes to be applied so that the resultant braking effect of all of the brakes will be equalized.

5. The combination with a plurality of brakes having movable braking elements, and means for applying a braking pressure to all of said braking elements simultaneously, of liquid pressure operated means adapted to be actuated by one braking element for actuating the braking elements of the other brakes so that the resultant braking effect of all of the brakes will be equalized.

6. The combination with a plurality of brakes having rotatable drums, and brake bands engageable with said drums, of means for moving said bands into braking engagement with said drums, and liquid pressure operated means adapted to be actuated by one brake band for actuating the brake bands of the other brakes so that the resulting braking effect of all of the brakes will be equalized.

7. The combination with a plurality of brakes having rotatable drums, and brake bands engageable with said drums, of means for contracting said bands upon said drums, and liquid pressure operated means adapted to be actuated by one brake band for actuating the brake bands of the other brakes so that the resultant braking effect of all of the brakes will be equalized.

8. The combination with a plurality of brakes having rotatable drums, and brake bands engageable with said drums, of levers pivotally connected to the ends of said brake bands, means for actuating said levers to move said bands into braking engagement with said drums, and means adapted to be actuated by one brake band for actuating the brake bands of the other brakes so that the resultant braking effect of all of the brakes will be equalized.

9. The combination with a plurality of brakes having rotatable drums, and brake bands engageable with said drums, of liquid pressure operated means for equalizing the resultant braking effect of said bands, and actuating members connecting said brake bands to said liquid pressure operated means.

In testimony whereof, we hereunto affix our signatures.

SAMUEL K. WELLMAN.
GORDON R. PENNINGTON.